July 28, 1959
W. A. TREPPARD
2,896,955
TOOL HOLDER AND TOOL ASSEMBLY
Filed June 26, 1958
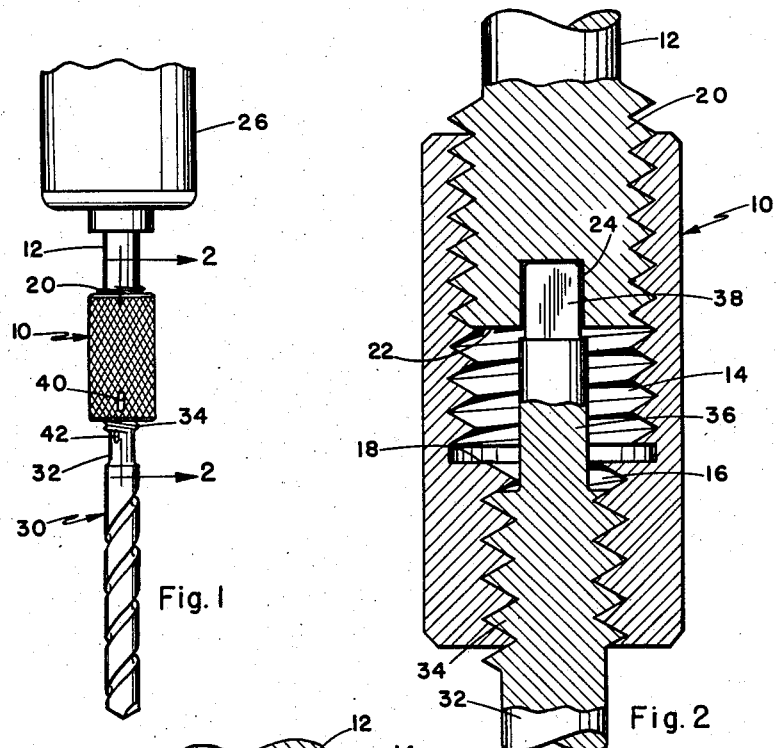
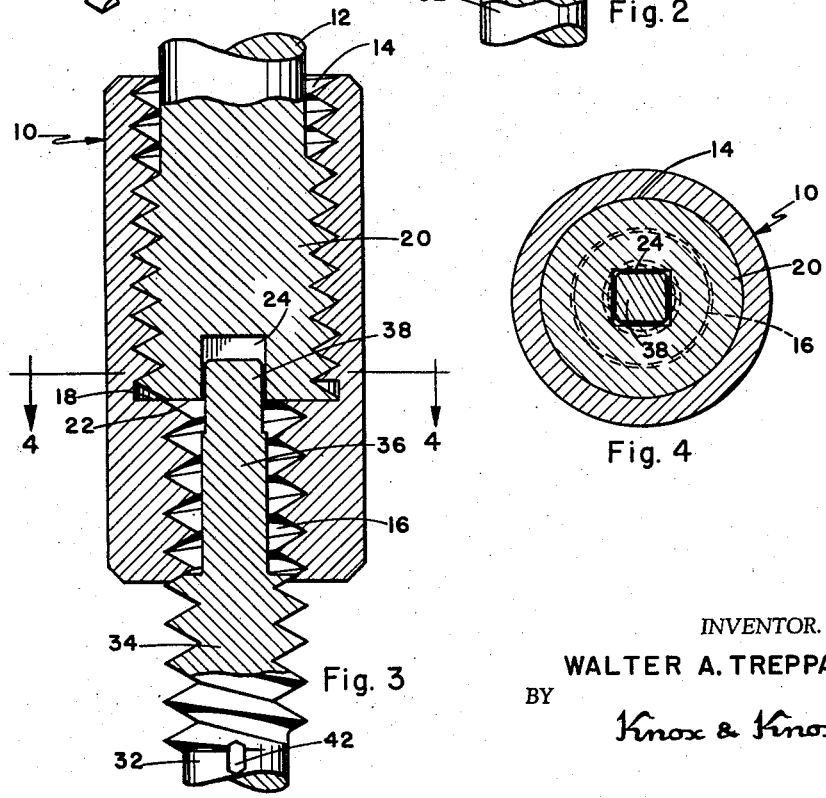
INVENTOR.
WALTER A. TREPPARD
BY
Knox & Knox

United States Patent Office 2,896,955
Patented July 28, 1959

2,896,955
TOOL HOLDER AND TOOL ASSEMBLY
Walter A. Treppard, San Diego, Calif.
Application June 26, 1958, Serial No. 744,814
3 Claims. (Cl. 279—7)

The present invention relates generally to tools and more particularly to a tool holder and tool assembly.

The primary object of this invention is to provide a tool holder which holds a rotary tool such as a drill bit, screwdriver, wrench, or the like firmly in alignment without any tendency to wobble or loosen.

Another object of this invention is to provide a tool holder and tool assembly having a positive locating and clamping action to secure the tool in place.

Another object of this invention is to provide a tool holder having an absolute minimum number of parts, reflecting decreased cost, simplified assembly and use, and elimination of the usual complement of pawls and camming means found in collet type holders.

A further object of this invention is to provide a tool holder which can be tightened by hand and requires a minimum of effort to exert the full clamping action on the tool.

Still another object of this invention is to provide a tool holder which is adaptable to many types of hand tools and power tools.

Another object of this invention is to provide a tool holder which is adapted for fabrication from many different materials, so that the choice of material can be according to the dictates of availability and price considerations, the exact sizes and proportions being matters easily determined to suit particular conditions and needs.

Another object of this invention is to provide a tool holder which is practicable and inexpensive to manufacture.

Finally, it is an object to provide a tool holder and tool assembly of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Figure 1 is a side elevation view of the tool holder attached to motor and having a drill bit secured therein;

Figure 2 is an enlarged sectional view taken on the line 2—2 of Figure 1, showing the tool holder in the fully locked position;

Figure 3 is a sectional view similar to Figure 2, but showing the tool holder in the starting or tool insertion position; and Figure 4 is a sectional view taken on the line 4—4 of Figure 3.

Similar characters of reference indicate similar or identical elements and portions throughout the specification and throughout the views of the drawing.

Referring now to the drawing in detail, the tool holder comprises two basic parts, a cylindrical sleeve 10 and a drive spindle 12. The sleeve 10 has a large screw threaded axial bore 14 extending from one end thereof for a major portion of the sleeve length, while at the other end is a small screw threaded bore 16, coaxial with and communicating with the large bore 14. At its junction with the small bore 16, the large bore 14 is undercut to provide a flat diametrical shoulder 18. Both the bores 14 and 16 are screw threaded in the same direction, the left hand thread as drawn being preferable especially when a shank extension, such as is used by electricians, is to be employed.

The drive spindle 12 has a screw threaded end 20 to fit in the large bore 14, the end face 22 thereof being flat and having a central, axially extending socket 24 of non-circular cross section. The socket 24, as illustrated, is of square shape but other shapes such as a hexagonal or rectangular form may be used. The non-threaded end of the drive spindle 12 may be adapted to fit a conventional motor of any suitable type, or may be part of a hand tool such as a carpenter's brace or a hand drill, the motor 26 in Figure 1 merely being one example of means for driving the spindle.

Mounted in the sleeve 10 is a tool 30, a conventional twist drill bit being illustrated by way of an example, although virtually any type of rotary tool such as a screwdriver, socket wrench, grinder, or the like may be adapted for use in the tool holder. The tool 30 has a shank 32 on which is a screw threaded portion 34 to fit the small bore 16, said shank having an extension 36 small enough to slip freely through said small bore and extending axially beyond said screw threaded portion, said extension having a key end 38 shaped to fit into the socket 24.

The operation of the tool holder is based on the use of a differential screw to draw the tool 30 into engagement with the drive spindle 12. Thus the screw threads in the small bore 16 are of somewhat coarser pitch than those in the large bore 14, the pitch difference ratio determining the rate at which the tool 30 is engaged. To insert the tool 30, the drive spindle 12 is first screwed all the way into the sleeve 10 until the end face 22 rests on the shoulder 18, as in Figure 3. The shank extension 36 is then inserted through the small bore 16 until the screw threaded portion 34 engages the screw threads in said small bore, the length of said extension being such that the key end 38 penetrates part way into the socket 24 at this position. In order to facilitate the starting of the screw threads, an indicator mark 40 is placed on the sleeve 10 and a corresponding positioning mark 42 on the shank 32 so that, when the two marks are axially aligned, the screw threaded portion 34 is correctly oriented to engage the first thread of the small bore 16. The sleeve 10 is then rotated by hand to screw onto the screw threaded portion 34 while being screwed off the screw threaded end 20. Due to the difference of the thread pitches, however, the tool 30 is drawn into the sleeve 10 faster than the drive spindle 12 is withdrawn, so that the key end 38 is firmly seated all the way into the socket 24, locking the tool securely in place. The length of the shank extension 36 is a critical factor in determining the number of turns of the sleeve 10 required to lock the tool 30 in place, since each turn draws the key end 38 a very small distance into the socket 24, the actual relative movement for each turn being equal to the difference in pitch of the two threads. It is desirable for maximum holding power, that all or most of the screw threaded portion 34 be engaged in the small bore 16, thus the initial gap between the key end 38 and the base of the socket 24 should be such that the closing motion requires the necessary number of turns. For ease of operation the outer surface of the sleeve 10 may be milled, as indicated in Figure 1, or otherwise provided with a gripping surface.

The tool holder locks the tool 30 firmly in place so that the tool and driving spindle 12 are virtually one solid, wobble free unit. Due to the large mechanical advantage afforded by the differential screw structure, a small turning force applied to the sleeve 10 is sufficient to exert a powerful clamping action on the tool.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention; and that the specification and drawing are to be considered as merely illustrative rather than limiting.

I claim:

1. A tool holder and tool assembly, comprising: a generally cylindrical sleeve having a large, axial screw threaded bore at one end, and a smaller screw threaded bore coaxial and communicating therewith at the other end; said large bore having a generally flat shoulder at its end adjacent the small bore; the pitch of the threads in said small bore being substantially greater than the pitch of the threads in said large bore; a drive spindle having a screw threaded end engageable in said large bore; said screw threaded end having a generally flat end face for contact with said shoulder, and a non-circular axially extending socket in said flat end face; a tool having a shank; a screw threaded portion on said shank engageable in said small bore; a reduced diameter shank extension extending axially from said screw threaded portion and having a key end thereon shaped to fit closely into said socket; both of said bores being screw threaded in a common direction, whereby rotation of said sleeve about said drive spindle and said tool simultaneously causes the tool to be drawn toward and to abut the drive spindle to seat said key end in said socket.

2. A tool holder and tool assembly according to claim 1, and wherein the length of said shank extension is such that, when said flat end face is abutting said shoulder and said tool is insertted with the screw threaded portion initially engaging said small bore, said key end is partially enclosed in said socket and, the difference in thread pitch of said bores being such that said key end is completely seated in said socket when substantially all of said screw threaded portion is screwed into said small bore.

3. A tool holder and tool assembly according to claim 1, and wherein the length of said shank extension is such that, when said flat end face is abutting said shoulder and said tool is insertted with the screw threaded portion initially engaging said small bore, said key end is partially enclosed in said socket and, the difference in thread pitch of said bores being such that said key end is completely seated in said socket when substantially all of said screw threaded portion is screwed into said small bore; said sleeve and said shank having cooperating visual indicating means thereon to guide the initial positioning thereof before the sleeve is screwed onto the shank.

References Cited in the file of this patent

UNITED STATES PATENTS

| 2,783,809 | Haines | Mar. 5, 1957 |

FOREIGN PATENTS

| 602,735 | France | Dec. 30, 1925 |